United States Patent [19]
Grube

[11] 3,877,133
[45] Apr. 15, 1975

[54] PIERCE NUT APPLYING METHOD

[75] Inventor: William L. Grube, Lake Bluff, Ill.

[73] Assignee: MacLean-Fogg Lock Nut Co., Mundelein, Ill.

[22] Filed: Feb. 23, 1973

[21] Appl. No.: 335,235

Related U.S. Application Data

[62] Division of Ser. No. 83,408, Oct. 23, 1970, abandoned.

[52] U.S. Cl. ............... 29/417; 29/432.2; 29/509; 29/243.53; 151/41.72; 151/41.73
[51] Int. Cl. ............... B23p 17/00; B23p 11/00
[58] Field of Search ....... 29/417, 432, 432.1, 432.2, 29/509, 243.53; 221/73; 151/41.72, 41.73

[56] References Cited
UNITED STATES PATENTS

| | | | |
|---|---|---|---|
| 2,754,516 | 7/1956 | Gasstrom | 29/417 X |
| 3,007,169 | 11/1961 | La Fleur et al. | 29/432 UX |
| 3,140,010 | 7/1964 | Double | 221/73 |
| 3,229,363 | 1/1966 | Bien | 29/432 |

Primary Examiner—Charlie T. Moon

[57] ABSTRACT

A method for rapidly attaching pierce nuts to a sheet which does not require completely new tooling for different designs of sheets. The nuts are made from a strip of metal and are complete except that they are left attached to one another and are thus predictably oriented. They are supplied to the attaching mechanism in rolled strip form. The attaching mechanism is a standardized unit enclosed in a single housing which automatically locates the end nut of the strip over the workpiece sheet, severs the nut from the strip, pierces the sheet with the nut and clinches the nut to the sheet while, if desired, embossing the sheet at the opening made therein by the nut. As many such standardized nut attaching units may be used simultaneously in a single punch press as are required, the tooling to be used comprising mainly means for locating the units relative to the sheet in the punch press.

4 Claims, 16 Drawing Figures

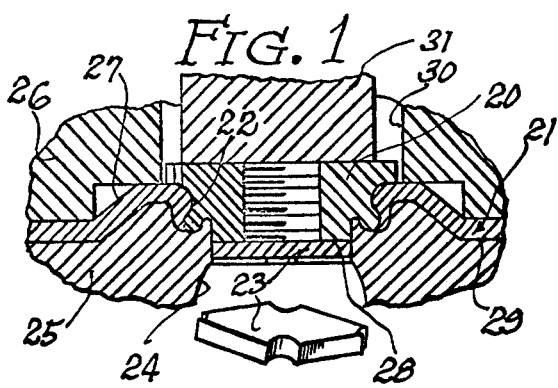
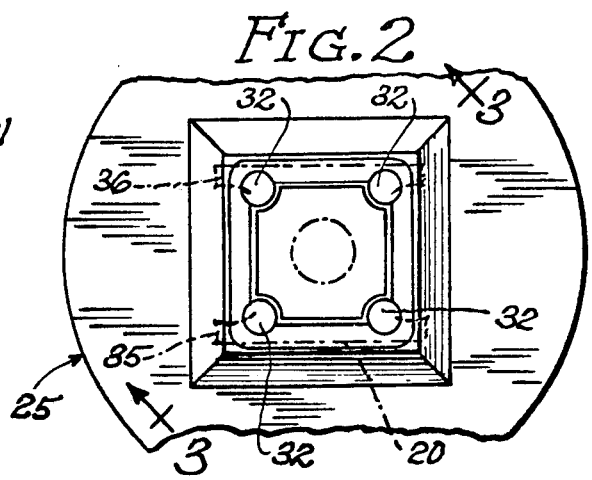
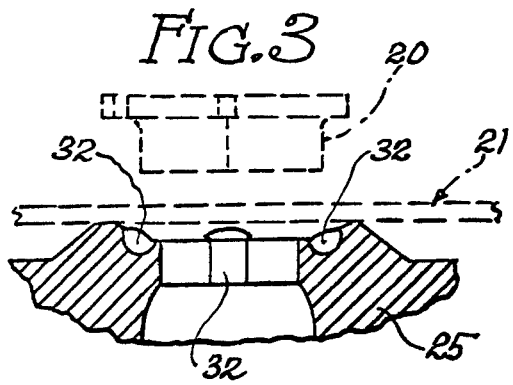
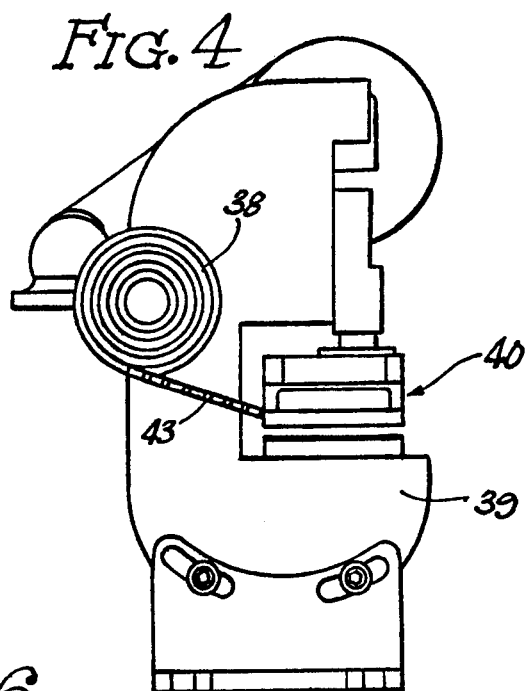
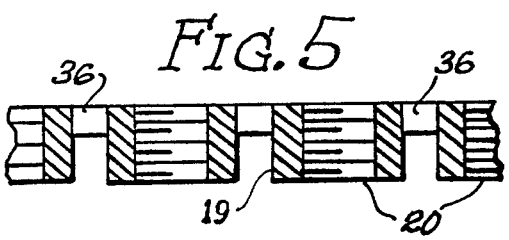
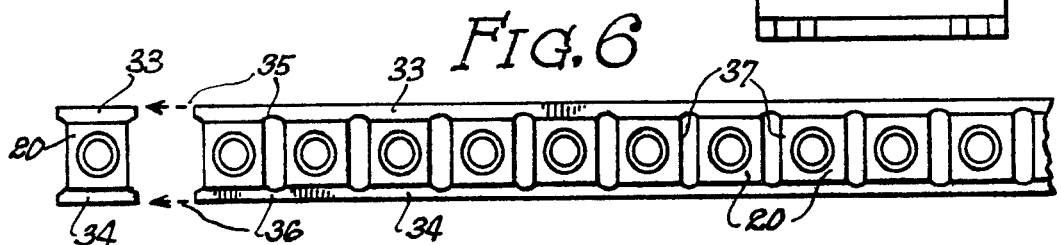
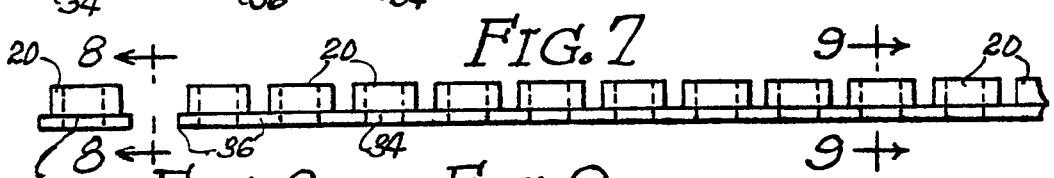
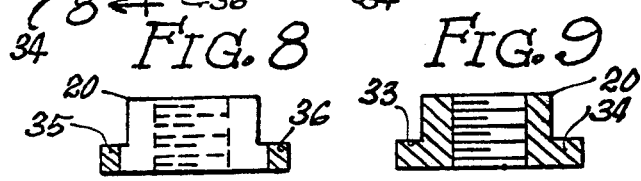
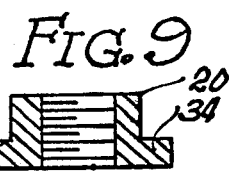

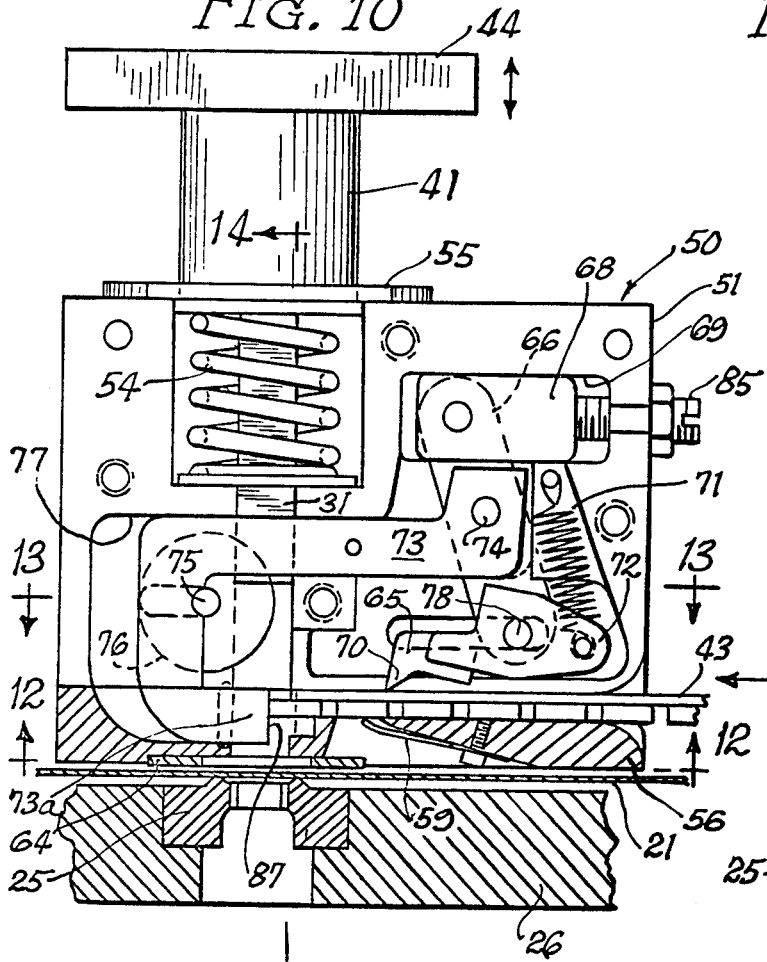

PIERCE NUT APPLYING METHOD

This is a division of my copending application Ser. No. 83,408 filed Oct. 23,1970, now abandoned.

This invention relates to a method of attaching pierce nuts to a sheet. It is particularly adapted for use with pierce nuts in strip form made in accordance with the article and method disclosed and claimed in my copending application Ser. No. 21,777, filed Mar. 28, 1970, now U.S. Pat. No. 3,704,507.

It has been known for many years to secure a nut to a sheet over a hole therein so that the sheet could be secured to a frame or another sheet by a screw without requiring the assembler to hold the screw over the opening on one side of the sheet while the machine screw fastener was inserted from the other side. It has also been known to use a nut as a punch to pierce an opening in a sheet, and to deform either the sheet, or the nut, or both to clinch the nut in place on the sheet in the opening, thus at once forming the opening, locating the nut properly over the opening and securing the nut non-rotatively to the sheet. Such nuts are known as pierce or clinch nuts.

It may be appreciated that the use of pierce nuts is limited to extremely high volume applications since a considerable amount of tooling and set-up is required in the handling, selecting and feeding of individual nuts. Once designed, the tooling can be used only for the specific application for which it was designed, i.e., each design is good only for one application, and if any changes are made in the sheet or location and number of nuts, completely new tooling is required.

The most difficult area in the use of pierce nuts has been in the handling of the individual nuts. These must be selected from a hopper, oriented and fed individually to the proper location on the sheet to which they are to be applied. Present selecting and feeding mechanism are limited as to the rate at which the pierce nuts can be handled.

It is an object of this invention to provide a method of feeding and applying pierce nuts to a workpiece sheet which method is faster, simpler and less expensive than methods now available.

Another object of this invention is to provide a method of feeding and applying pierce nuts to a sheet which is unitized and standarized and therefore more flexible in its applciations, such that expensive custom-designed tooling can be substantially eliminated.

These and other objects of this invention will become apparent from the following detailed description of a preferred embodiment of the invention when taken together with the accompanying drawings in which:

FIG. 1 is a section through the pierce nut, workpiece and clinching die of the type to which this invention may be applied;

FIG. 2 is a plan view of the bottom die of FIG. 1;

FIG. 3 is an elevation in section of the bottom die of FIG. 2 taken along line 3—3 thereof;

FIG. 4 is a side elevational view of a known punch press in which this invention is installed;

FIG. 5 is an enlarged longitudinal section through a strip of nuts of the kind used with this invention;

FIGS. 6 and 7 are plan and side views, respectively, on a reduced scale of the strip of FIG. 5;

FIGS. 6 and 7 are plan and side views, respectively, on a reduced scale of the strip of FIG. 5;

Figure 15:
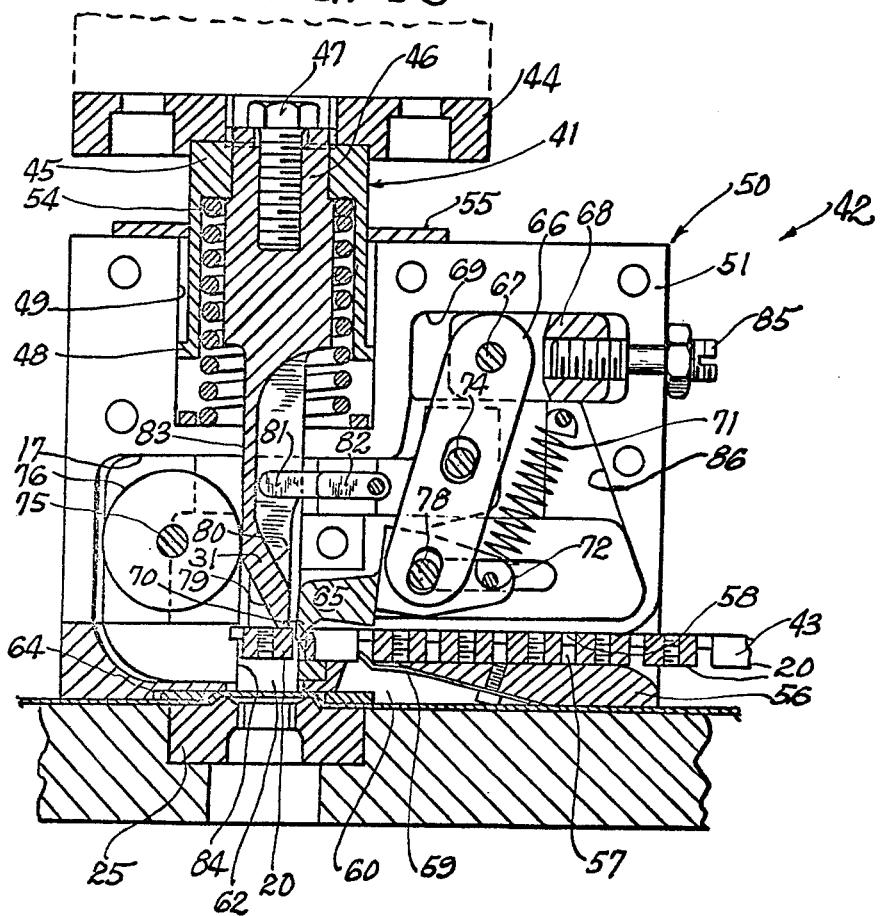
Figure 16:
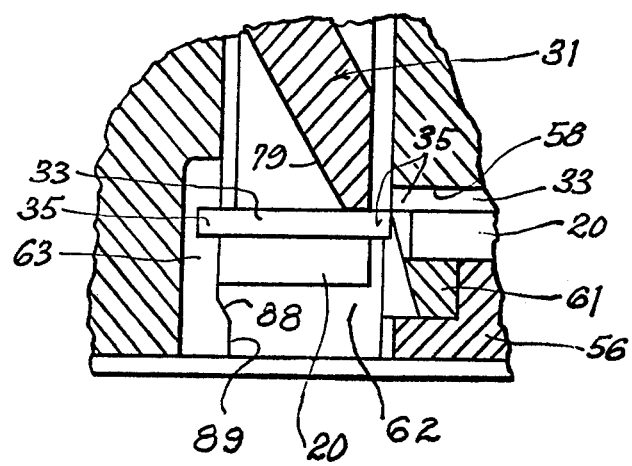

FIGS. 8 and 9 are sections through the strip of FIG. 5 taken along lines 8—8 and 9—9, respectively, of FIG. 7;

FIGS. 10 and 11 are, respectively, front and side elevations of the device of this invention, FIG. 10 being a section taken along line 10—10 of FIG. 11;

FIG. 12 is a bottom view of the device of this invention taken along line 12—12 of FIG. 10;

FIG. 13 is a plan view in section through the device of FIG. 10 taken along line 13—13 thereof;

FIG. 14 is a side elevational view in section of the device of FIG. 10 taken along line 14—14 of FIG. 10;

FIG. 15 is a front elevational view in section of the device similar to FIG. 10, but showing the device in another stage of operation; and FIG. 16 is an enlarged vertical section through the shear insert of the tool.

The present invention is based upon the use of pierce nuts in strip form such as are described and claimed in my aforesaid copending application Ser. No. 21,777 filed Mar. 28, 1970, now U.S. Pat. No. 3,704,507. As there described, the nuts are formed in a strip of metal having rolled therein the requisite laterally extending flanges for pierce nuts, complete with properly threaded holes and with perforated connectors joining adjacent nuts together to preserve the original orientation and planar relation of the nuts to one another. The use of these "strip nuts", as they shall be referred to hereinafter, eliminates at once the vibration feed hoppers and their chutes or other devices normally used to select, orient and conduct the nuts to the point of application on the workpiece. It also eliminates dependence upon the limitations in the rate of selection and feed of the nuts imposed by such hoppers and chutes, as well as the time lost in correcting malfunctions thereof.

The strip nuts are inserted into a unit incorporating this invention, which unit has been affixed to the punch press in which the fastening of the nut to the workpiece is to be effected. Said unit is provided with means for converting the vertical reciprocating motion of the ram of the press into horizontal reciprocatory motion utilized to advance the strip, one nut at a time, to the punch which then severs the nut from the strip, pierces the workpiece with the severed nut and clinches the nut to the workpiece. Thus the feeding, severing, piercing and clinching operations are all performed by the said unit, utilizing the vertical motion and energy of the punch to power all of such operations. Several such units may be affixed to the same punch press to attach simultaneously a plurality of clinch nuts to a workpiece.

Referring now to the drawings for a detailed description of the invention, attention is directed first to FIGS. 1—3 which illustrate the preferred form of nut and clinching method to be used with this invention, although it is understood that other forms of nuts and clinching methods can also be used. In FIG. 1, the nut is shown at 20 in the position it assumes with respect to a workpiece 21 which is shown in the form of a sheet metal panel, the nut having pierced an opening 22 in the workpiece and left a slug 23 which is to be ejected by succeeding slugs through an opening 24 in the bottom die 25. The piercing operation is effected by a punch 31 reciprocating in an opening 30 in a pad 26. In the form selected to illustrate this invention, said bottom die 25, in cooperation with pad 26, also forms a boss 27 in workpiece 21 so that the surface 28 of nut 20 will be co-planar, or flush, with surface 29 of workpiece 21 to make it possible for the workpiece to be secured to another surface of the structure of which workpiece 21 is a part.

FIG. 2 shows the bottom die 25 in plan view and also shows, for clarification, the inwardly projecting means at the corners 32 for deforming the corners of the nut 20 to effect the desired interlock with workpiece 21. FIG. 3 shows a section through the corners 32 of bottom die 25 and the location, in dotted outline, of the workpiece 21 and flanged nut 20 at the beginning of the piercing operation.

The nuts as supplied to die 25 are shown in FIGS. 5—9. The individual nuts (FIG. 8 and 9) are substantially square in cross section and are formed with laterally and oppositely extending flanges 33, 34 which serve as abutments to limit the movement of a nut into a workpiece it has pierced. The portion 19 of nut extending beyond flanges 33,34 is sometimes termed the pilot or shank portion of the nut and is the portion which is used as a punch to pierce an opening in workpiece 21. Said workpiece may be a sheet metal panel, bracket or machine part. The nuts are supplied in strip form, each nut being connected to its adjacent nut by portions 35, 36 of the flanges 33, 34 which remain when openings 37 are punched in the flanged strip of stock to form the individual nuts. The details of the strip form of nut and the method of making and applying it to a workpiece are described and claimed in my aforesaid U.S. Pat. No. 3,704,507.

The nuts in the stip forms of FIGS. 6 and 7 are furnished in coils 38, as shown in FIG. 4, to a punch press 39 in which the nut application tool 40 of this invention is installed. The strip is fed to tool 40 with the flanges 35, 36 uppermost as shown in FIG. 5. If more than one nut is to be applied to a workpiece at a time, then as many application tools 40 and coils 38 are provided in punch press 39 as there are nuts to be simultaneously applied. Appropriate fixtures (not shown) will be provided to locate the workpiece in press 39 relative to the tools 40.

It has been found that although, ideally, the connecting portions 35, 36 should be punched out in the tool 40 to leave a neat and symmetrical nut 20, in practice these connecting portions are not generally visible to the exterior of the panel so that appearance is a minor factor. In addition, the slugs formed by the punched out connecting portions 35, 36 create a disposal problem which, if not properly solved, might result in having the slugs fall upon and get pressed into the workpiece to mar its appearance. In the form illustrated, therefore, the connecting portions are sheared in half so that each nut has one-half of a connecting portions 35, 36 extending from opposite sides thereof.

Tool 40 is shown in FIGS. 10—15. It is comprised of a vertically reciprocable plunger 41 and an assembly carried by said plunger and adapted to be suspended over bottom die 25 in a die block 42 secured to the bed (not shown) of punch press 39. The workpiece 21 is shown disposed between die 25 and the bottom of the tool assembly, and the nuts in strip form from coil 38 are shown at 43.

Referring to the cross sectional view of the tool shown in FIG. 15, the punch 31 is secured to a mounting plate 44 which, in turn, is adapted to be secured to the reciprocating ram (not shown) of punch press 39. Plunger 41 is comprised of a punch retainer 45 which is centered in mounting plate 44 and which, in turn, centers the upper portion 46 of punch 31. A fastener 47 secures plate 44, puch 31 and retainer 45 together to function as a unit.

The bottom end of retainer 45 has a radially outwardly extending flange 48 and reciprocates in a recess 49 in a housing 50 which is split vertically in the plane of FIG. 15 into two substantially symmetrical parts 51 and 52 (FIG. 11). The parts 51 and 52 are secured together by appropriate screws 53 (FIG. 13). A compression spring 54 bears against the bottom of recess 49 and urges retainer 45 upward. A stop is provided for retainer 45 by a washer 55 on housing 50 extending over recess 49 and adapted to be engaged by flange 48.

Across the bottom of housing 50 is secured a feed block 56 which is formed with a T-shaped groove 57 in the upper part thereof and to the right of punch 31 as viewed in FIG. 15 along which the strip nuts 43 are fed to the punch. The strip nuts are retained in the groove by the bottom 58 of the housing 50. A finger spring 59 is secured to the sloping bottom of a centrally disposed groove 60 in feed block 56, said spring extending into groove 57 and into the space between adjacent nuts 20 in the strip nuts 43. Spring 59 allows the strip nuts to be fed toward punch 31, but prevents movement of the nuts in the opposite direction.

Adjacent punch 31, feed block 56 is provided with a shear insert 61 (FIG. 16) which extends under the connecting flange parts 35 and 36 between adjacent nuts 20 and cooperates with punch 31 to shear said parts 35 and 36 in half. This leaves one-half of each connecting part with the nut 20 so that each nut has portions of the connecting parts extending from opposite sides thereof to present a symmetrical appearance. Next to shear insert 61 in feed block 56 is an opening 62 through which the severed nut is pushed to the workpiece by punch 31 for the piercing, embossing and clinching operations. Slots 63 are formed in feed block 56 adjacent opening 62 in which the connecting parts 35, 36 extending from the severed nut 20 are received and slide vertically. An embossing plate 64 is secured to the bottom of feed block 56 to cooperate with bottom die 25 during the embossing operation.

Strip nuts 43 are advanced intermittently toward punch 31 by a pawl 65 which is bifurcated at its right hand end as viewed in FIGS. 10 and 15 to receive pivotally one end of a rocker arm 66, the other end of which is pivoted at 67 to a pivot block 68 horizontally adjustable in a recess 69 in housing 50. The nose 70 of pawl 65 is adapted to enter the opening 37 between adjacent nuts and is urged to enter said openings by a tension spring 71 connecting a tail portion 72 on pawl 65 and an elevated point on housing 50.

Referring now to FIG. 10, horizontal reciprocating movement is imparted to pawl 65 by a drive link 73 connected at one end to a pivot pin 74 passing through rocker arm 66 and movable therewith, and connected at its other end to a pin 75 which is also the shaft about which a roller 76 rotates. Said other end reciprocates in a recess 77 in housing 50, and the reciprocating movement is transmitted to rocker arm 66 and then through said rocker arm 66, at an amplified rate, to pawl 65 through a pin 78 connecting the arm to the pawl. Drive link 73 receives its reciprocating movement from a cam surface 79 (FIG. 15) in a slot on one side of punch 31 on which roller 76 rolls. The return reciprocating movement is derived from a cam surface 80 in a slot on the other side of punch 31 in which a pin 81 rides, said pin having one end connected to drive link 73.

It may be apparent from the foregoing description of drive link 73, roller 76 and pin 83 that as punch 31 moves downward, it first causes roller 76 and drive link 73 to move to the left as viewed in FIGS 10 and 15, which then causes pawl 65, then received in an opening between adjacent nuts in the strip nuts 43, to push said strip nuts to the left as viewed in FIGS. 10 and 15 until the end nut of the strip is directly over opening 62. At the time said end nut is so located, roller 76 is out of contact with cam surface 79 and thereafter rides on the vertical surface 83 on the side of punch 31 which acts as a dwell surface while the punch continues its downward stroke. On the return or upward stroke, pin 81 engages cam surface 80 and causes a reverse movement of drive link 73. On such reverse movement pawl 65 will be moved out of the opening in the strip nuts it then occupied and will slide over one nut and drop into the next opening in readiness to advance the end nut again under punch 31. Spring finger 59 holds the strip nuts against backward movement with pawl 65.

The point at which the pawl 65 ceases to drive the strip nuts 43 toward punch 31 is not critical, so long as it is within about 1/32th of an inch of its designed position. A reasonably correct location of the end nut is assured in the present tool by causing the side of the nut to abut upon the side 84 of opening 62 at the end of the left-hand movement (FIG. 15) of pawl 65. The exact location of the nut is achieved when the severed nut passes downward over a guide surface 88 (FIG. 16), which shifts the nut into a precisely located portion 89 of opening 62. Excessive movement of pawl 65 beyond this point is avoided by adjusting the position of pivot block 68 in recess 69. The adjustment is accomplished by appropriately turning a screw 85 connected to block 68 and held against axial movement in housing 50.

It is understood that a recess 86 is formed in housing 50 of a size and shape to accommodate the mechanisms used to effect the reciprocating movement of pawl 65, as well as to accommodate pawl 65 itself.

In the operation of the device of this invention, it is assumed that mounting plate 44 is secured to the ram of punch press 39 to be movable therewith and that housing 50 is secured to the bed or frame of press 39, or to an appropriate fixture which is secured to such bed or frame. Where more than one application tool 40 is used in one press, a fixture (not shown) will be prepared to locate the workpiece relative to the application tools so that the nuts 20 are secured at the proper places on the workpiece.

At the beginning of a cycle, when the ram of the press is raised, the parts of the application tool will appear as in FIG. 10. It may be noted that the bottom portion of drive link 73 has a forwardly extending leg 73a the front vertical surface 87 of which is intended to serve as a stop to limit the initial insertion of strip nuts 43 into the tool. Said leg 73a is relatively narrow and, as seen in FIG. 14, operates in a slot in the side of opening 62 under punch 31 so that it is withdrawn as the workpiece is advanced over said opening 62. Without leg 73a, it would be possible to insert strip nuts into the tool to the extent that the end nut would be under punch 31 with the punch raised, and the subsequent downward movement of the punch and the resulting movement of pawl 65 to the left to advance a nut over opening 62 would cause the tool to jam, since the pawl could not move the strip nuts beyond the opening 62 over which the end nut is already located. Leg 73 a holds the strip nuts back until drive link 73 and pawl 65 move forward, so that the end nut moves forward with the link and pawl.

Thus, with tool 40 in the stage shown in FIG. 10, the strip nuts 43 are advanced into contact with surface 87 by the operator of the press from a coil 38 located near the press, the workpiece is located under tool 40 by an appropriate fixture (not shown) to receive a nut 20 at a desired location thereon. and the punch press is then activated by the operator to commence an application cycle. With the operation of the press, punch 31 is lowered by the ram of the press against the resistance of spring 54. The lowering of punch 31 causes roller 76 to ride along cam surface 79 and thus move to the left as viewed in FIGS. 10 and 15. Drive link 73 is caused to move to the left by roller 76 and, through rocker arm 66, imparts this movement, at an amplified rate to pawl 65. Said pawl 65 drops into an opening 37 between adjacent nuts in the inserted strip nuts 43 and advances the strip nuts into the tool. Pawl 65 is so located relative to surface 87 on leg 73a that it will be in an opening 37 at the beginning of the movement of drive link 73. The position of pivot block 68 is adjusted in a manner to insure such location of pawl 65.

As roller 76 leaves cam surface 79 and thereafter rides on the vertical surface 83 of punch 31, forward movement of the strip nuts ceases, and continued downward movement of punch 31 lowers punch 31 upon the end nut 20 over opening 72, shears the said end nut from the strip nuts 43 at the mid-point of the connecting flange parts 35, 36 and pushes the shank portion 19 of the severed nut against, and then through, workpiece 21 until flanges 33, 34 abut against said workpiece, punching out a rectangular slug from the workpiece in the process. The nut and workpiece are then clinched together in the die 25 and the punch is withdrawn by the upward movement of the ram of the press.

As punch 31 moves upward, pin 81 encounters cam surface 80 on the punch, and this causes said pin 81 to move to the right as viewed in FIG. 15. Roller 76 is free at this point to be moved in the same direction by cam surface 79. Drive link 73 therefore moves to the right as viewed in FIG. 15, taking pawl 65 with it through the operation of rocker arm 66. Strip nuts 43, however, are held against outward movement with pawl 65 by finger spring 59 which has entered the space between adjacent nuts 20 and blocks such outward movement. At the end of the upward movement of punch 31 the cycle is complete.

It may be observed that the specific forms of the nut and clinching die are not material to this invention, although the nut will have a workpiece-piercing shank portion and an abutment of some kind limiting the movement of the shank portion through the workpiece, and that the application tool herein described and claimed may be used with equal effectiveness with other types of clinch nuts. The tool is a unit which may be designed for a given size nut in strip form and treated for design purposes as a part of a standard system for applying clinch nuts to a workpiece. The nuts are supplied in the form of a coiled strip, along with the application tool 40 and bottom die, and the tool designer then adapts the system to a particular fixture for handling the specific workpiece to which the nuts are to be fastened. No apparatus for singulating, orienting, transporting to a die and successively applying loose nuts to a workpiece is required. Gang operation in a single punch press of two or more application tools is entirely possible, thereby vastly simplifying, speeding up and cheapening the application of clinch nuts to a workpiece.

It is understood therefore that the foregoing description is merely illustrative of a preferred embodiment of this invention, and that the scope of the invention is not to be limited thereto, but is to be determined by the appended claims.

I claim:

1. The method of effecting the attachment to a metal panel of pierce nuts having two surfaces at the ends of shank portions and adjoined in a composite strip which strip embodies a series of correspondingly oriented and substantially discrete nuts joined together in aligned relationship by connecting means having flexibility in a direction normal to the top surfaces of the nuts, said method comprising the steps of locating the panel over a die with the panel engaging a top surface of the die, advancing the end nut of the strip over the panel to a predetermined position over the die by engaging and moving a fixed distance a transverse surface of the nut, the panel being disposed between the shank portion of said end nut and die and engaging an elevated supporting surface of the die which surrounds a substantially coplanar and continuous peripheral cutting edge of the die, severing said connecting means between said end nut and the rest of the strip, flexing a portion of the panel within said elevated supporting surface toward and into contact with said cutting edge by force applied to the shank portion of said nut and piercing said flexed portion of the panel with the shank portion of the severed nut to cut a slug from the panel and effect the mounting of the nut on the panel, and securing the nut in its mounted position on the panel.

2. The method of effecting the attachment of a pierce nut to a metal panel as defined in claim 1, and wherein the panel adjacent the nut is deformed by the die as a result of force applied by the shank portion of the nut prior to piercing the panel.

3. The method according to claim 3, said step of advancing the end nut of the strip comprising engaging a transverse surface of the nut disposed in the space between adjacent nuts.

4. The method according to claim 1, said step of advancing the end nut of the strip a fixed distance being performed independently of the position of the leading edge of the nut.

* * * * *

UNITED STATES PATENT OFFICE
CERTIFICATE OF CORRECTION

PATENT NO. : 3,877,133
DATED : April 15, 1975
INVENTOR(S) : William L. Grube

It is certified that error appears in the above-identified patent and that said Letters Patent are hereby corrected as shown below:

Col. 1, lines 66 and 67, delete entire sentence.
Col. 3, line 18, after "nut" insert --20--; line 31, change "stip" to --strip--.
Col. 4, line 3, change "puch" to --punch--.
Col. 5, line 2, after "end" insert --82--.
Col. 8, line 18, delete "3" and insert in its place --1--.

Signed and Sealed this nineteenth Day of August 1975

[SEAL]

Attest:

RUTH C. MASON
Attesting Officer

C. MARSHALL DANN
Commissioner of Patents and Trademarks